United States Patent [19]

Westerberg

[11] 3,745,311

[45] July 10, 1973

[54] PNEUMATIC PROGRAM CONTROL SYSTEM

[75] Inventor: Sven Peter Jonas Westerberg, Saltsjo-Boo, Sweden

[73] Assignee: Atlas Copco Aktiebolag, Nacka, Sweden

[22] Filed: Aug. 6, 1971

[21] Appl. No.: 169,649

[30] Foreign Application Priority Data

Aug. 25, 1970 Sweden .................................. 11523

[52] U.S. Cl. .............................. 235/61.11 J, 73/156

[51] Int. Cl. ... F15b 21/02, G05d 16/00, G06k 7/02

[58] Field of Search .......................... 235/61.11, 201; 137/83, 624.11; 73/37, 156; 91/36, 37

[56] References Cited

UNITED STATES PATENTS

| | | | |
|---|---|---|---|
| 3,515,858 | 6/1970 | Weaver | 235/61.11 J |
| 3,598,310 | 8/1971 | Bingham et al. | 235/201 PF |
| 3,114,035 | 12/1963 | Avery | 235/61.11 J |
| 3,645,442 | 2/1972 | Bauer | 235/201 PF |
| 3,057,974 | 10/1962 | Cohen | 235/201 FS |
| 3,392,381 | 7/1968 | Hargens | 235/61.11 J |
| 3,417,232 | 12/1968 | Lukoff et al. | 235/61.11 J |
| 3,472,259 | 10/1969 | Hatch et al. | 235/61.11 J |

*Primary Examiner*—Maynard R. Wilbur
*Assistant Examiner*—Thomas J. Sloyan
*Attorney*—Robert D. Flynn, Leonard Holtz et al.

[57] ABSTRACT

A pneumatic program control system having reading blocks for reading a perforated card or tape in which system a group of reading elements in the reading blocks are used each time a reading is performed for a programmed reading of the working condition of the controlled set-up as represented by the condition of detecting valves.

15 Claims, 8 Drawing Figures

Patented July 10, 1973 3,745,311

5 Sheets-Sheet 1

PNEUMATIC PROGRAM CONTROL SYSTEM

The present invention relates to a pneumatic program control system of the type including pneumatically actuated control means and pneumatic detecting means and wherein a perforated program carrier is moved step by step by a feeding device into position between reading blocks in which aligned co-operating pairs of sensing elements are provided to establish pneumatic signal connections from one of the reading blocks to the other when the sensing element pairs coincide with holes in the program carrier. output signal passage means connects the reading elements in said other reading block with the control means of the system for the actuation of said control means.

A known control system comprises a plurality of control or logic circuits often in the form of modules in a modulized control unit. It is advantageous for economical reasons to use that type of control systems in controlling sequences having a moderate number of cyclically repeated steps, especially sequences requiring logical decisions from the control unit. In such control systems the stepping, i.e., the transferring of the order signal from a step to the next of the sequence is carried out by transferring the activated condition of the control circuits of the control unit from one control circuit to another.

Another known control system comprises a few or just one single control or logic circuit and a stepping device which is assigned to the stepping function of the control system and also constitutes the program means of the control system. The stepping device can comprise a circulating automatic pneumatic step-by-step selector in the form of a valve, the maximum number of steps of the sequence to be controlled being equal to the number of steps of the step-by-step selector. Upon a change and by that a re-programming of the controlled process very time-consuming re-arrangements of signal connections have to be made, since the program itself lies in the arrangement of the signal connections. In another embodiment the stepping device comprises a card or tape reading device. In such control systems the programming is practically independant from the coupling between the control system and the process to be controlled. A change of the program of the process can in this case be made by simply inserting a new program card or a new program tape into the reading device maintaining the signal connections between the control system and the process.

All of the above control systems require normaly a great number of relay functions on the input side for following up the detecting valve conditions of the system and, thus, become quite expensive when it comes to controlling sequences which comprise a large number of steps, especially if one or more working moments irregularly recur in the sequence.

SUMMARY OF THE INVENTION

It is an object of the present invention to eliminate the above expensive features, especially in control systems of the tape reading type and at the same time make it possible to work with uncoded programs and with such a working pressure of the reading air on the output side that the control means of the the working process and when necessary also the working means of the process can be directly operated. The control system and the tape reading device have to be so arranged in this case that programming can be carried out on the input side as well as on the output side which leads to a simplification of the design of the system seen as a whole and is combined with increased flexibility of the programming. These objects are attained in a pneumatic program control system having the characterizing features set forth in the claims.

BRIEF DESCRIPTION OF THE DRAWINGS

The invention will be described more in detail with reference to the drawings on which.

DETAILED DESCRIPTION OF PREFERRED EMBODIMENTS

Figure 1:
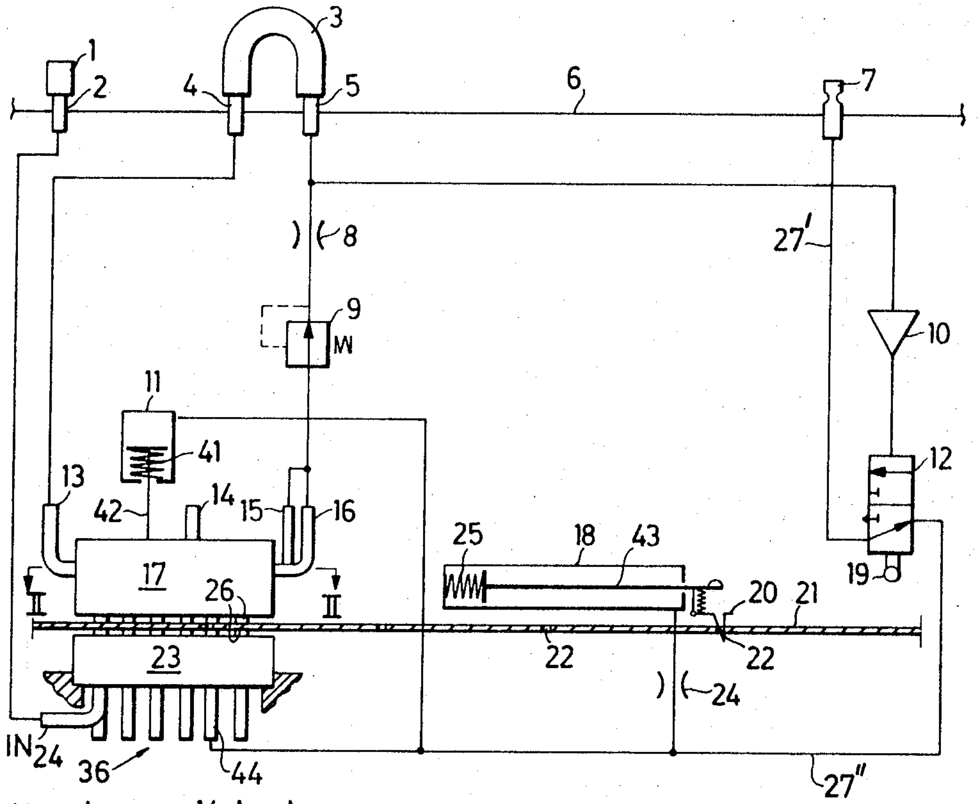
FIG. 1 schematically shows a control system according to the invention.

The reading means of the control system comprises a first reading block 17 and a second reading block 23 which comprise pairs of reading elements, each reading element pair comprises a reading element in the first reading block and a co-operating reading element in the second. Each reading element pair comprises a reading channel 28 (FIG. 6) in the reading block 17 and co-operating reading channel 29 in the reading block 23. The reading channels 28, 29 have an orifice facing a program carrier 21 in the form a tape or a card which is inserted between the reading blocks 17, 23. Each reading element further comprises a couple of sealings 26 which are fixed to the reading blocks 17, 23 around the orifices of the reading channels 28, 29 for sealing against the program carrier 21, so that a leakproof signal connection can be established from the reading channel 28 to the reading channel 29 via a program hole, e.g., 58, 52 (FIGS. 4 and 5) in the program carrier.

Figure 2:
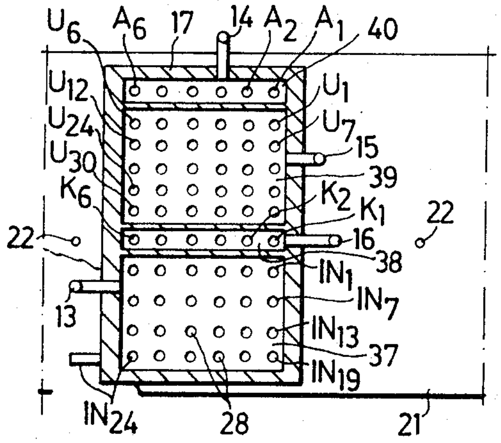
FIG. 2 shows the reading means of the control arrangement according to FIG. 1 in section along a line II—II in FIG. 1.

The reading channels 28, 29 of the reading blocks 17, 23 have according to FIG. 2 been allotted the designations $IN_1$–$IN_{24}$, $U_1$–$U_{30}$, $K_1$–$K_6$, $A_1$–$A_6$ common to the reading element pairs and their individual connections in the reading block 23. In the reading block 23 the connections are formed by nipples 36, one for each reading channel 29, and by hoses, e.g., plastic hoses, connected to the nipples.

The reading channels 28 of the first reading block 17 are connected in groups and the groups are connected to connections 13, 14, 15 and 16, one for each group. According to FIG. 2 each group of reading channels 28 emerges into a common chamber 37–40 and the chambers are provided with an inlet plug for the connections 13–16. In FIGS. 1–3 and 6 are shown as an example four such groups each having a chamber and a group connection, viz. an input chamber 37 and the connection 13 for input signals, a checking chamber 38 and the conection 16 for check signals, an output chamber 39 and the connection 15 for output signals and a venting chamber 40 and the connection 14 for venting.

The reading block 17 is movable relative the reading block 23. A block separating means 11 in the form of a pneumatic cylinder comprises a piston and rod 42 fixed to the reading block 17 and adapted to separate the block 17 from the block 23 by means of a spring 41 for obtaining a spacing larger than the thickness of the program carrier between the blocks during each program carrier move. By the influence of pressure air in the block cylinder 11 the reading blocks 17, 23 are brought together into reading position after program carrier move so that sealing is obtained between the reading elements and the program carrier 21 on both sides of the same and including the the program hole pattern of the program carrier 21.

A feeding device 18 for moving the program carrier 21 comprises a pneumatic cylinder having a piston and rod 43 being biassed by a spring 25. The feeding device 18 is so arranged that the stepping of the program carrier takes place when the spring 25 drives the piston rod 43 outwards. The program carrier 21 is provided with feeding holes 22 evenly spaced along the length of the program carrier. A spring biassed hook 20 is carried by the piston rod 43 and engages a new feeding hole 22 when the piston rod 43 is retracted before each new stepping of the program carrier 21.

The group $K_1$–$K_6$ of reading elements is intended for check signals. The check relates to whether a program carrier is inserted and whether its reading position is correct. Check reading air is supplied to a reading element pair $K_2$ via a nipple 44 in the reading block 23. If the reading position of the program carrier is correct a signal connection is established via a check hole, e.g., one of the holes 22 in the program carrier to the checking chamber 38 in the reading block 17, which is in connection with several pairs of reading elements ($K_1$–$K_6$). If a program carrier is correctly inserted the connection between these other reading element pairs ($K_1$ and $K_3$–$K_6$) is, however, interrupted by the program carrier. Then, the pressure increases in the checking chamber 38 and in its group connection 16. This pressure increase constitutes a check signal which indicates that the program carrier lies correctly and that a reading of the program can be made. The signal is supplied to the group connection 15 and the output chamber 39 in the block 17 and serves as reading air for reading the program. Pressure air is supplied via program holes in the program carrier 21 to reading channels 29 of the reading block 23 ($U_1$–$U_{30}$) which supply order signals to the control or working means which are to be actuated in the set-up controlled by the system.

The control system further comprises a pressure reducing means 9 (9') for providing a pressure air flow of low pressure suitable for fast program reading, a restriction 8 (8') restricting the air flow from the presure reducing means 9 (9'), an amplifier 10 for amplifying obtained detecting or input signals to a suitable working pressure, a restriction 24 in the control circuit to the feeding device 18 which makes it possible to actuate the block separating means 11 set under pressure at the same time ahead of the feeding device 18, and a bistable step valve 12 which has an input controlled by supplied pressure air and a mechanically controlled input. The mechanically controlled input 19 is actuated by the piston rod 43 at the end of each stepping of the program carrier 21. An operating panel 6 has a connecting means in the form of a bayonet coupling means 7 to which a hose not shown on the drawings is connected from an external pressure air source, a selecting means in the form of a short conduit 3 which via two nipples 4, 5 is connected in the supply path for input reading air to the group connection 13 of the reading block 17, and a starting-stopping means in the form of a nipple 2 which is connected to the detecting connection $IN_{24}$ and a plug 1 which can be inserted into and removed from the nipple 2. The coupling means 7 is connected to the bistable valve 12 via a conduit 27' (FIG. 1) and the pressure air connection continues therefrom to the feeding device 18, the block cylinder 11 and the nipple 44 of the reading block 23 via a conduit 27''.

The program control system according to FIG. 1 functions as follows. The piston rod 43 of the feeding device 18 is in its outer position by means of the spring 25 before the system is set under pressure and sets the step valve 12 to the initial position shown in FIG. 1. At the same time the reading blocks 17, 23 are kept separated by the spring 41 of the block cylinder 11 and all inputs and outputs are vented via the blocks.

Pressure air is connected via the coupling means 7 and by this the feeding cylinder 18 and the block cylinder 11 are aired via the conduits 27' and 27'' and the step valve 12. First, the reading blocks 17, 23 are pressed together around the program carrier 21 and, then, the piston rod 43 is retracted into the cylinder 18. The hook 20 engages a new hole 22 in the program carrier 21. Then, the feeding device 18 is ready for a new stepping movement and remains in ready position as long as the step valve 12 remains in its initial position. At the same time as the airing of the block separating cylinder 11 reading air flows via conduit 27'' to the nipple 44 and the checking chamber 38 of the reading block 23 in which a pressure increase is built up via a check hole in the program carrier 21. This pressure increase brings about a pressure air flow from the checking chamber 38 which flow is used as an order signal and transferred via the group connection 16 to the group connection 15 and the output chamber 39 for the output signal. The output signals are represented by the reading element pairs $U_1$–$U_{30}$ of the chamber 39 and are made up of conduits connected to corresponding nipples of reading block 23 which conduits carry the signals to pneumatically actuatable control means or working means of the program control system for actuating these means in accordance with the present combination of holes in the program carrier 21, which holes open a connection between desired reading element pairs in the output chamber 39. At the same time pressure air is supplied from the group connection 16 to the pressure reducing means 9 and departs as low pressure air from the means 9 to the restriction 8, the conduit 3, the group connection 13 and the input chamber 37 of the reading block 17 for reading detecting means,for example in the form of valves included in the program control system which valves signal the working condition of the controlled set-up. The holes of the program carrier 21 program the reading element pairs $IN_1$–$IN_{23}$ which are to be read via the input chamber 37. The reading itself is carried out by means of detecting valves 53 (FIG. 6) connected to the reading block 23 via signalling conduits, each detecting valve closing an individual signalling conduit from the reading element pairs kept open by the program holes. When all the valves have closed a pressure increase appears in the input chamber 37 and in its group connection 13. This pressure increase defines that all of the programmed detecting valves are actuated and serve as an AND-condition between detecting valves in each reading step.

The signal generated by the pressure increase in the input chamber 37 is transferred downstream of the restriction 8 to the pressure amplifier 10 which amplifies the signal pressure to a suitable working pressure and generates an actuating signal to the step valve 12. In the new position of the step valve 12 the block cylinder 11 is discharged without delay while the feeding cylinder 18 is discharged after a certain delay which is dependent on its volume and on the restriction 24 which delay can be regulated when necessary. Thus, the reading blocks 17, 23 are separated by the spring 41 and after that the spring 25 of the feeding cylinder 18, the piston rod 43 and the hook 20 moves the program carrier 21.

After the stepping is completed the piston rod 43 returns the step valve 12 mechanically to its initial position by striking the plunger 19. By this the conduit 27'' is once again set under pressure via the conduit 27' and the step valve 12 and the working cycle of the program control system is repeated as described above.

Figure 3:
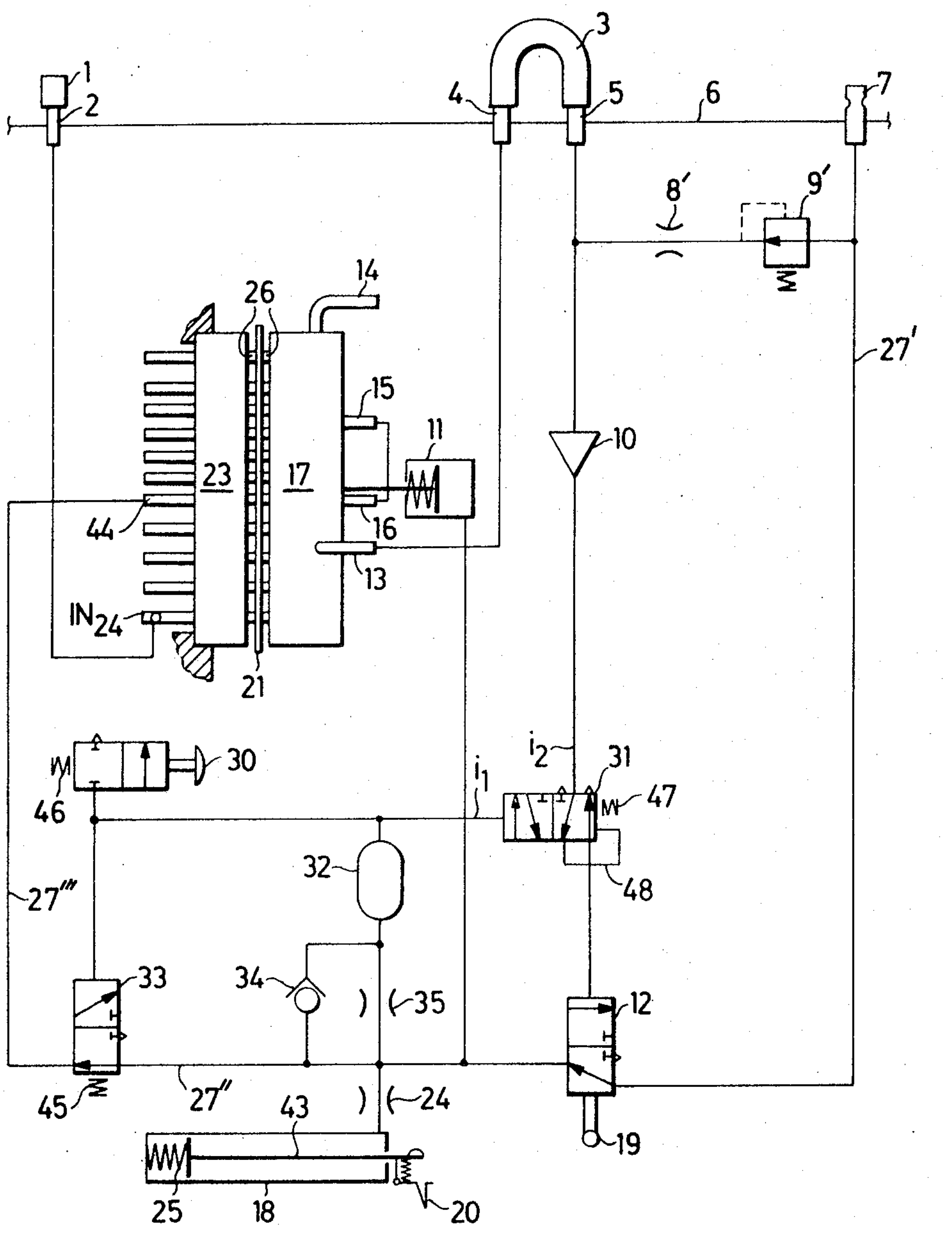
FIG. 3 shows schematic-ally another embodiment of the control system which, however, has the same reading means as that shown in FIGS. 1 and 2, FIGS. 4 and 5 show schematical examples on connecting control and operating means to the output side of the reading device.

In the program control system according to the embodiment shown in FIG. 3 the reading means is unchanged and shown in such a position that the feeding of the program carrier 21 takes place perpendicular to the plane of FIG. 3. The feeding device is schematically shown next to the program carrier 21. The pressure reducing means 9' and its succeeding restriction 8' are connected directly to the conduit 27' and are continuously supplying reading air to the group connection 13. This control system works with pulsed output signals contrary to the control system according to FIG. 1 which uses continuous output signals. For that reason the system is provided with a delay pulse circuit. This circuit comprises a restriction 35 connected to the conduit 27'' downstream of step valve 12, a volume 32, a return valve 34 connected across the restriction 35 which return valve opens for a flow from the volume 32 to the conduit 27'' and a monostable pulse valve 33 having a pressure control input connected to the volume 32 and a return spring 45 as second input. The pulse valve 33 is connected between the conduit 27'' and a conduit 27''' to the nipple 44 of the reading block 23. A hand-operated valve 30 having a return spring 46 is used to stop the control system momentarily by discharging the pressure control output of the pulse valve 33. By this the control signal on an input $i_1$ of a logic means 31 fails to appear. The logic means 31 is used to bring about logic conditions which are to be explained more in detail below. The logic means 31 has two inputs, viz. a first $i_1$ and a second input $i_2$ and is so arranged that two conditions are required for generating an output signal, viz. a main condition and a secondary condition. According to the main condition signals have to be present on both of the inputs simultaneously and according to the secondary condition the input signal on the first input $i_1$ has to appear before the input signal on the second input $i_2$ if an output signal is to be obtained from the logic means 31. According to the present embodiment the logic means 31 comprises a two-way five port valve, the first input $i_1$ of which is connected to the volume 32 of the pulse circuit while its second input $i_2$ comprises the middle port of the valve which is connected to the pressure amplifier 10 and, thus, receives the stepping signal. Moreover, the valve 31 is provided with a return spring 47 and a holding connection 48 connected to the pressure amplifier 10 as indicated in FIG. 3. The holding connection 48 receives its signal via the input $i_2$ when the valve 31 is at rest (FIG. 3). Then the valve 31 cannot open for delivering a stepping signal. The output of the logic means 31 is connected to the pressure controlled input of the step valve 12 so that the step valve 12 is actuated upon an output signal from the logic means 31 and discharges the conduit 27''. By this the stepping of the program carrier 21 is brought about by activating the block cylinder 11 and the feeding device 18 as described in connection with the control system according to FIG. 1.

Figure 7:
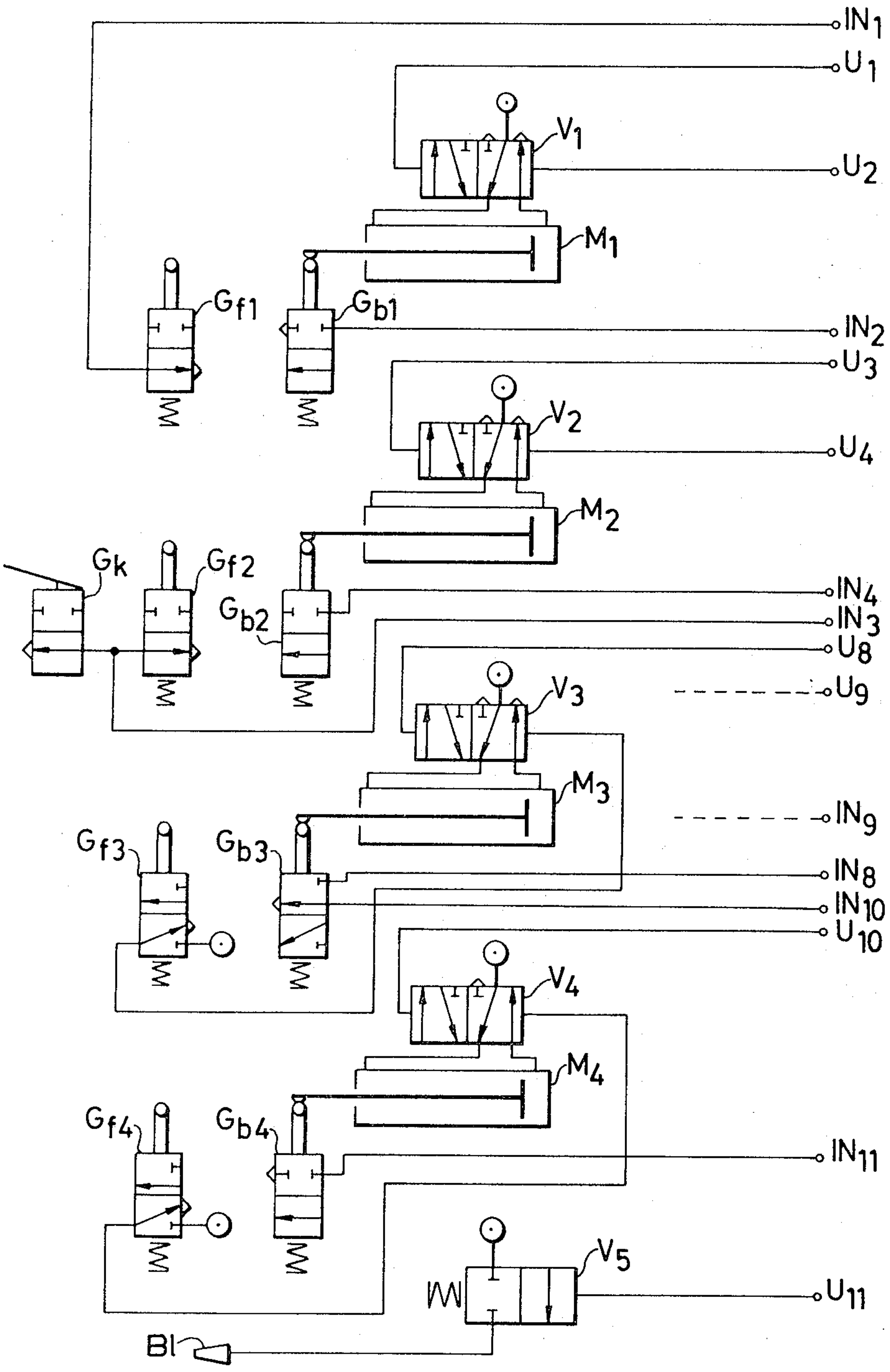

A solution to an automation problem by means of the control system according to FIG. 3 is described below in connection with FIG. 7. Right-angled blanks (not shown) are to be provided with two holes which is carried out by the following working steps: (a) automatic feeding, (b) chucking, (c) checking the chucking of the blank, (d) drilling two holes, (e) expelling the blank and (f) cleaning and stopping or returning to step (a).

The following means are used:

a feeding motor $M_1$, a chucking motor $M_2$, a checking valve $G_k$, two automatic drilling units with feeding motors $M_3$ and $M'_3$ ($M'_3$ is not shown), an expelling motor $M_4$ and a blowing nozzle B1. The control means for each motor comprises a pneumatically actuatable directional valve connected to the pressure air supply which valve is denoted V with an index corresponding to the index of the respective motor. To each motor are assigned detecting means in the form of a limit valve for indicating the initial position of the motor and a limit valve for indicating its deflective position. The detecting valves are denoted $G_b$ and $G_f$ with a second index equal to the index of the corresponding motor. It is defined in FIG. 7 by the reference characters $IN_1$–$IN_{11}$ and $U_1$–$U_{11}$ which in- and output connections are used in the reading blocks 17, 23 according to FIG. 3 for connecting the directional valves V and the detecting valves G respectively.

Pressure air is supplied via the bayonet coupling 7 and transferred via the conduit 27', the step valve 12 and the conduit 27'' on one hand to the block cylinder 11 so that the reading blocks 17 and 23 are brought together into reading position and on the other to the feeding device 18 which is moved to its ready position for the next feeding step as shown in FIGS. 1 and 3. Pressure air is supplied from conduit 27'' via the pulse valve 33, the conduit 27''', the nipple 44 of the reading block 23, the checking chamber 38 and the group connections 16, 15 to the output chamber 39. In this chamber the reading elements are set under pressure and via a program hole in the program carrier 21 the output $U_1$ is kept open for a pressure signal to the directional valve $V_1$ whereby the same is actuated and the motor $M_1$ starts and the feeding of a blank is commenced.

Pressure air is supplied from the conduit 27', the step valve 12 and the conduit 27'' at the same time to the restriction 35 of the pulse circuit and via the same to the volume 32 which is filled and during the filling acts as a delay for the pressure signal in conduit 27'''.

At the same time pressure air is continuously supplied from the conduit 27′ via the pressure reducing means 9′, the restriction 8′ and the group connection 13 to the input chamber 37. In the program carrier 21 there is a hole in the reading position in question in connection to a chamber 37 for the reading element pair $IN_1$ and via said hole pressure air is supplied to the detecting valve $G_{f1}$.

When the volume 32 of the pulse circuit has been set under pressure the pressure controlled input of the pulse valve 33 is actuated which pulse valve is actuated against the action of the spring 45 and closes the conduit 27″ and interrupts i.e., pulses the reading order signal to the chambers 38, 39 by discharging the conduit 27‴.

The setting under pressure of the volume 32 leads also to a pressure actuation of the input $i_1$ of the logic valve 31 and this valve is actuated against the action of the spring 37 provided that the holding connection 48 is not set under pressure. Such a too early pressure setting of the holding chamber 48 can arise from incorrect initial setting (closed position) of the detecting valves which are read via the chamber 37. The motor $M_1$ works during this time and closes finally the detecting valve $G_{f1}$. This leads to a pressure increase in the input chamber 37 which actuates the step valve 12 via the group connection 13, the amplifier 10 and the logic valve 31. By this the conduit 27′ is closed while the conduit 27″, the block cylinder 11 and the feeding device 18 are discharged whereby the reading blocks 17, 23 can be separated and the program carrier 21 is stepped one step by means of a spring 25 of the feeding device 18. At the same time the volume 32 is discharged via the return valve 34 and the conduit 27″ and the pulse valve 33 and the logic valve 31 return to initial position under action of the springs 45, 47. At the end of the motion of the feeding device 18 the step valve 12 is returned to its initial position. Then the block cylinder 11 and the feeding cylinder 18 are once again aired via the conduit 27″, the blocks 17, 23 are brought together, the feeding device 18 returns to its initial position and pressure air is supplied to the nipple 44 of the reading block 23 via the pulse valve 33 and the conduit 27‴. Then, an output signal is sent via the current program hole in the program carrier 21 to the output $U_2$ of the directional valve $V_1$ which is actuated so that the feeding motor $M_1$ is returned to its initial position. By this the detecting valve $G_{b1}$ is actuated and a new stepping is released by the input program reading. The valve $V_2$ is switched after the stepping by means of an order signal via the output $U_3$ which is combined with a concurrent signal via the input chamber 37 to the input $IN_3$ so that the chucking motor $M_2$ deflects and actuates the corresponding detecting valve $G_{f2}$. Then, if the blank has reached the correct position for processing, the checking valve $G_k$ is also actuated. The two last mentioned valves are interconnected and both are connected to the input $IN_3$ (FIG. 7) so that an AND-condition is formed for the reading of the program. When this condition is fulfilled with both valves actuated and closed, the next stepping takes place. Alternatively, the valves can be connected to separate inputs IN of the reading block 23 so that the AND-condition is brought about directly by input programming in the form of holes in the program carrier 21. During the new reading the input $IN_{10}$ is set under pressure and at the same time the valves $V_3$ and $V'_3$ ($V'_3$ not shown) are actuated via the outputs $U_8$ and $U_9$ and the motors $M_3$ and $M'_3$ advance the drilling units. As soon as the motor $M_3$ leaves the detecting valve $G_{b3}$ the input $IN_{10}$ brings about an input pressure increase and a new stepping whereby the actuating signals of the valves $V_3$ and $V'_3$ are eliminated via outputs $U_8$ and $U_9$ at the same time as the inputs $IN_8$ and $IN_9$ are set under pressure. During that time the drilling units continue to work and returns each one separately to the initial position after the motors $M_3$ and $M'_3$ have reached their projected positions and actuated the detecting valves $G_{f3}$ and $G'_{13}$ ($G'_{f3}$ not shown) respectively, since these valves, as apparent from FIG. 7, are connected to the pressure air supply and in their turn set the actuating inputs of the valves $V_3$, $V'_3$ under pressure to bring about a return. By means of the AND-condition formed by inputs $IN_8$ and $IN_9$ in the input program the subsequent stepping is brought about when the two drilling units have returned to the initial position and closed the detecting valves $G_{b3}$ and $G'_{b3}$. Upon the subsequent reading an order signal is transferred to the valve $V_2$ via the output $U_4$ for releasing the working pressure by means of the chucking motor $M_2$ and this motor returns to its initial position and actuates the valve $G_{b2}$. This brings about the subsequent stepping via the input $IN_4$ and an order signal is concurrently transferred via outputs $U_{10}$ and $U_{11}$ to the directional valves $V_4$ and $V_5$ for concurrently expelling and cleaning the drilled blank. Since pulsed order signals are used in this embodiment the cleaning time as well as the duration of the output signal $U_{10}$ equal to the duration of the order pulse. The detecting valve $G_{f4}$ which is connected to the pressure air supply switches upon actuation directly the valve $V_4$ to its initial position and after that, upon the return of the motor $M_4$, the pressure signal $IN_{11}$ for the subsequent stepping is supplied by the detecting valve $G_{b4}$ which indicates that the expelling motor has returned to its initial position and that the cleaning is finished.

In the position of the tape during the last working operation in a sequence or a working cycle an input program hole $IN_{24}$ in the program carrier 21 establishes a signal connection to the starting and stopping means 1, 2. If the plug 1 is out the stepping is stopped. If on the other hand the plug 1 is inserted into the nipple 2 the stepping is repeated as described above for the case that an endless tape or a program carrier having a repeated program is used.

The program control system is stopped at the end of a step in progress if the selecting means 3 is removed whereby the reading air supply cannot reach the input group connection 13 and the stepping ceases. If the number of means controlled exceeds the capacity of the reading block 23 more reading means can be inserted in order to increase the capacity.

Figure 4:
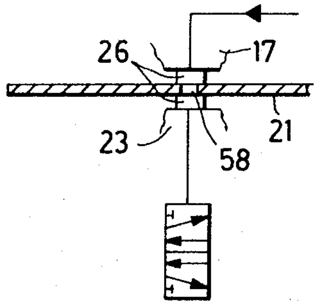
Figure 5:
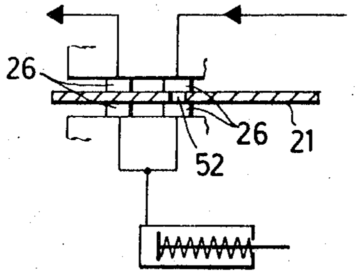

Each reading element pair of the reading blocks 17, 23 functions principally as a two-port valve which normally is closed. When in reading position a program hole 58 of the program carrier 21 according to FIG. 4 coincides with the position of the reading element pair, the two-port valve is open. Besides these two conditions there is a very short discharging condition during the motion of the program carrier 21. There is time for discharging working means having small amounts of air during the program carrier motion which working means, thus, may be connected to only one output as indicated in FIG. 4. If a greater amount of air is to be discharged, e.g., when a cylinder is connected directly to an output of the reading means without connecting an intermediate control valve, two reading positions can be used per cylinder in accordance with FIG. 5 in which a reading position 52 in one step is used for airing and another position (not shown) in the subsequent step is used for discharging. Then, the discharging is carried out via a reading element pair and a program hole in the venting chamber 40 of the reading block 17.

Figure 6:
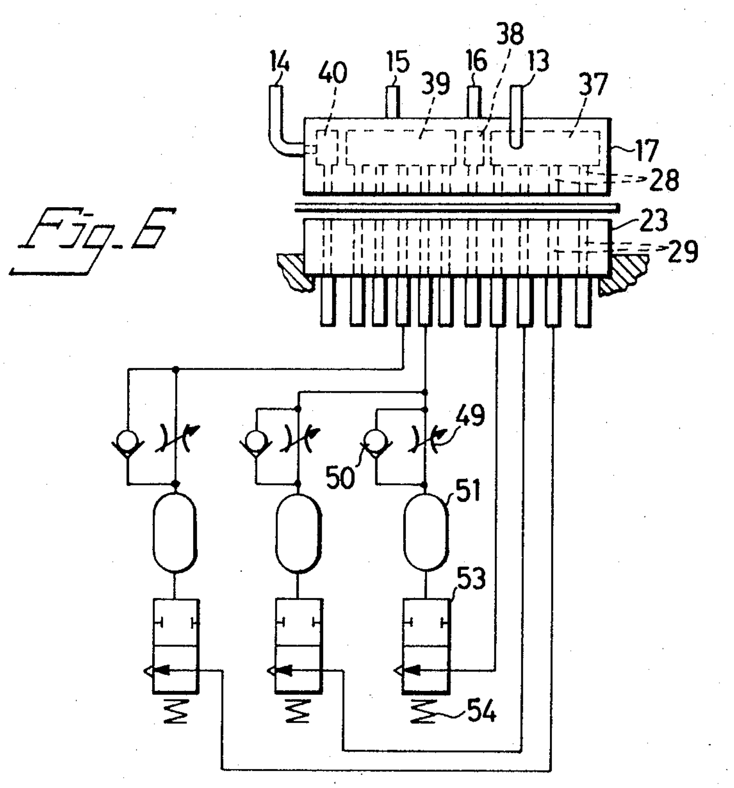
FIG. 6 shows a circuit diagram for time controlling in the control system, FIG. 7 together with FIG. 3 show schematically an example of controlling a working process.

Some working operations, e.g., cleaning, cannot be acknowledged by simple detecting valves but are time controlled instead. Concurrently with a continuous or pulsed order signal via the output chamber 39 according to FIG. 6 a signal from one of the outputs of the reading block 23 is also sent to the working unit in question via a delay circuit 49, 50, 51 (analagous to the pulse circuit 35, 34, 32 of FIG. 3) to a detecting valve 54 having a return spring 53 and a pressure actuated input connected to the delay circuit 49—51. Upon actuation by pressure the valve 53 closes a detecting input connected to the input chamber 37 of the block 17. After some time determined by the volume 51 of the delay circuit 49–51 a pressure increase is brought about in the chamber 37 in that the valve 53 blocks the air flow from said volume whereby the stepping is released. Several delay circuits having mutually different delays controllable by means of the restrictions 49 can when necessary be used as indicated in FIG. 6.

Figure 8:
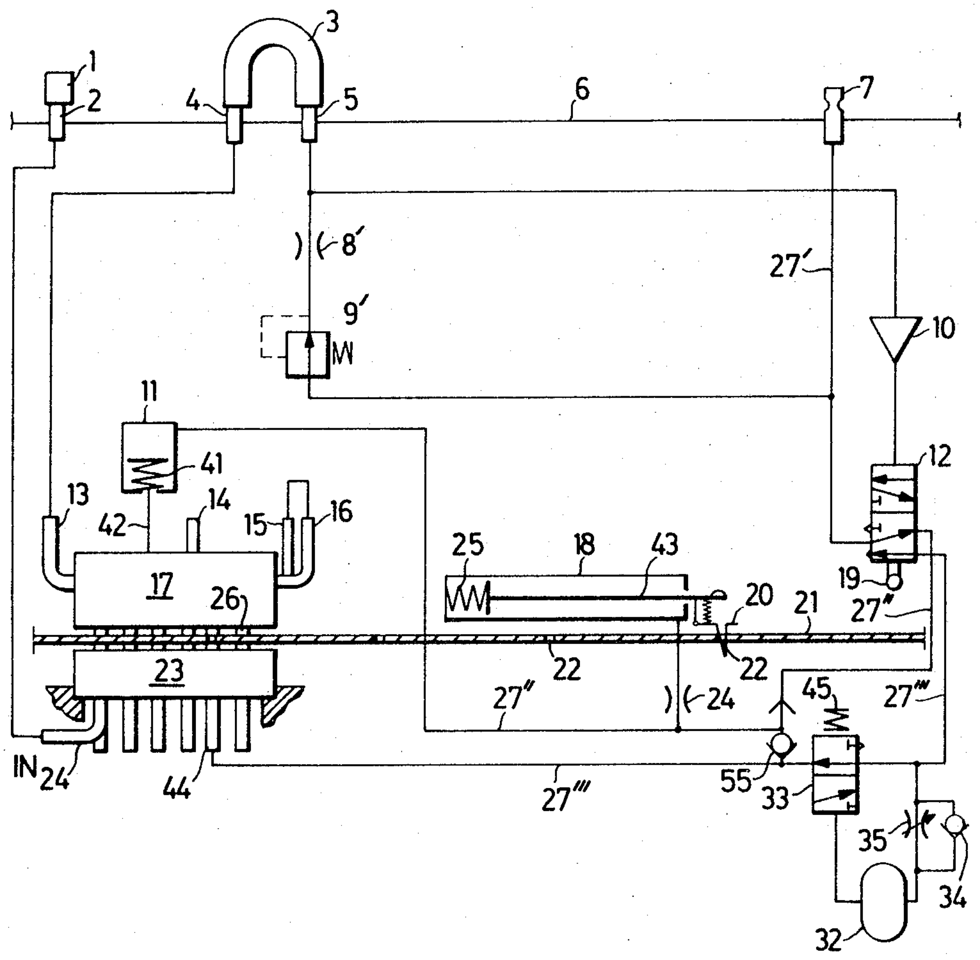
FIG. 8 shows a third embodiment of the control system provided with an unchanged reading device.

In the embodiment according to FIG. 8 the pressure reducing means 9', the restriction 8' and the group connection 13 are directly connected to the conduit 27'. The conduit 27'' downstream of step valve 12 is via a reversing valve 55 connected only to the block cylinder 11 and the feeding device 18. The step valve 12 is a five-port valve which in its initial position (FIG. 8) connects the conduit 27' to the conduit 27'' and at the same time discharges the conduit 27''' which is in connection with the nipple 44 of the reading block 23 and also with the reversing valve 55. The pulse valve 33 described in connection with FIG. 3 and its pulse circuit formed by elements 32, 34, 35 is moreover connected to the conduit 27'''. Upon pressure from the amplifier 10 the step valve 12 connects in actuated position the conduit 27' to the conduit 27''' while the conduit 27'' is being discharged upstream of the reversing valve 55.

If pressure air is supplied to the conduit 27' via the bayonet coupling 7 the conduit 27'' is, thus, set under pressure and together with said conduit also the block cylinder 11 and the feeding device 18 as in the other embodiments. At the same time pressure air is supplied to the group connection 13 for reading the input program. If the detecting valve reading is correct (closed valves) a pressure increase is obtained as before downstream of the restriction 8 which increase is amplified in the pressure amplifier 10 and switches the step valve 12 to its actuated position. By this the conduit 27''' is set under pressure and an output signal is transferred via the nipple 44 and the reading blocks 23, 17 to the group connection 15 for output signals. At the same time the reversing valve 55 is set under pressure via the conduit 27'''. Thus, the conduit 27'' downstream of the reversing valve 55 maintains its pressure whereby the block cylinder 11 continues to keep the reading blocks 17, 23 in the reading position and the feeding device remains ready for stepping. At the same time also the pulse circuit is actuated and after a predetermined time the delay elements 34, 35, 32 actuate the pulse valve 33 which downstream discharges the conduit 27''' and also the block cylinder 11 and the feeding device 18 via the reversing valve 55 which is in its position opposite to that shown in FIG. 8. This brings about stepping.

The embodiment according to FIG. 8 is advantageous when it comes to obtaining the fastest possible reading and stepping processes during the sequence control.

I claim:

1. A pneumatic program control system comprising:
two reading blocks between which a program carrier having program holes therein is fed;
means for selectively clamping said blocks together with the program carrier therebetween during reading of said program carrier;
a feeding device for advancing a program carrier step by step into subsequent readout positions between said reading blocks;
a plurality of sensor means for establishing pneumatic connections from one of the blocks to the other when corresponding sensor means coincides with program holes in the program carrier;
a common supply passage means supplying a group of said sensor means with compressed air, said common supply passage having a restriction therein;
a plurality of normally open detector valves connected by input signal passages to said sensor means of said group of sensor means so as normally to vent said common supply passage downstream of said restriction;
a plurality of pneumatically operated control means connected by means of output passages to the sensor means not belonging to said group of sensor means so as to be actuatable through program holes in the program carrier; and
a control circuit for initiating a further reading operation in response to a back pressure building up in said common supply passage when all of said normally open detector valves of said group of sensor means are closed that are connected to said common supply passage through program holes in the program carrier, the closing of said detector valves closing the venting of said common supply passage and causing said back pressure build up.

2. A system according to claim 1 wherein said common supply passage leads to an input chamber in said one reading block, the sensor means of said group of sensor means leading from said input chamber; and means are provided for supplying, via a pressure reducing means and said common supply passage, said input chamber with pressure fluid of lower pressure than supplied to said sensor means connected to said output passages.

3. A system according to claim 1 wherein said control circuit includes a bistable valve means for pneumatically operating said feeding device, said bistable valve means having a control inlet operatively connected to said common supply passage at a point downstream of said restriction, said bistable valve being adapted to take a first position for stepping in response to a pressure rise in said control inlet, and said control circuit further includes means to shift said valve into its other position in response to a completion of an advance step.

4. A system according to claim 3 wherein said feeding device comprises an actuator means including a reciprocable piston element connected to said bistable valve so as to be supplied with pressure fluid when said valve is in said other position and so as to be vented when said valve is in said first position, said piston element being spring biased to produce an advancing step of said carrier upon a relief of fluid pressure through said bistable valve.

5. A system according to claim 3 wherein said common supply passage leads to an input chamber in said one reading block, the sensor means of said group of said sensor means leading from said input chamber; means are provided for supplying, via a pressure reducing means and said common supply passage, said input chamber with pressure fluid of lower pressure than supplied to the sensor means connected to said output passages; and further including a pressure amplifier interconnected between said common supply passage and said control inlet of said bistable valve.

6. A system according to claim 4 including a spring retracted pneumatic device connected in parallel with said actuator means and arranged for forcing said reading blocks together into a reading position in which the carrier is clamped between said blocks.

7. A system according to claim 3 wherein said restriction as well as said sensor means connected to said output signal passages are provided downstream of said bistable valve.

8. A system according to claim 4 including a pulse valve provided downstream of said bistable valve and being actuatable for selectively discharging pressure fluid from said feeding device.

9. A system according to claim 8 wherein the sensor means connected to said output signal passages are provided downstream of said pulse valve, such that upon actuation of said pulse valve pressure fluid from said sensor means of said output signal passages is discharged.

10. A system according to claim 1 wherein said common supply passage and said sensor means of said output signal passages are connected in parallel in relation to the pressure fluid supply connection of said system.

11. A system according to claim 15 wherein said sensor means are comprised of cooperating ports in said reading blocks and are provided with annular flexible sealing elements affixed to the respective reading block for sealing against the program carrier when said reading blocks are clamped together into a reading position with the program carrier between said reading blocks.

12. A system according to claim 15 wherein the sensor means connected to said output passages are connected as a group in series with and downstream of another of said sensor means which is adapted to be supplied with pressure fluid and which is adapted to coincide with a check hole in the program carrier when the latter is clamped between said reading blocks in a readout position.

13. A system according to claim 15 comprising at least one delay circuit coupled to one of said output passages and to an individual detector valve which in its turn is coupled to one of said input signal passages.

14. A system according to claim 15 wherein said sensor means comprise cooperating ports in said reading blocks, the ports of said one reading block being connected in groups to an input chamber and to an output chamber, and the ports of said other reading block are connected by individual signal connections respectively to actuate said control means and to transmit pressure signals from said detector valves.

15. A system according to claim 1 wherein said control circuit further initiates said feeding device to advance the program carrier a step in response to said back pressure build up.

* * * * *